(12) United States Patent
Liao et al.

(10) Patent No.: US 7,577,346 B2
(45) Date of Patent: *Aug. 18, 2009

(54) IMAGE SENSING MODULE

(75) Inventors: Jian-Chao Liao, Taichung (TW);
Ching-Jung Tsai, Taichung (TW);
Wen-Hung Hsieh, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 373 days.

This patent is subject to a terminal disclaimer.

(21) Appl. No.: 11/278,557

(22) Filed: Apr. 4, 2006

(65) Prior Publication Data

US 2007/0065128 A1    Mar. 22, 2007

(30) Foreign Application Priority Data

Sep. 16, 2005   (CN)   .................. 2005 1 0099371

(51) Int. Cl.
*G03B 17/00* (2006.01)
*B23Q 1/62* (2006.01)
(52) U.S. Cl. ................. 396/55; 348/208.4; 108/21; 33/1 M
(58) Field of Classification Search ............. 396/52–55, 396/153; 348/208.99, 208.2, 208.4, 208.7, 348/208.11; 359/557, 813; 108/20, 21; 33/1 M
See application file for complete search history.

(56) References Cited

U.S. PATENT DOCUMENTS

| | | | | |
|---|---|---|---|---|
| 4,013,339 A | * | 3/1977 | Ando et al. | .................. 359/556 |
| 5,266,988 A | * | 11/1993 | Washisu | ....................... 396/55 |
| 7,268,336 B2 | * | 9/2007 | Hsieh et al. | ............... 250/208.1 |
| 2005/0265705 A1 | * | 12/2005 | Uenaka | ....................... 396/55 |
| 2006/0017815 A1 | * | 1/2006 | Stavely et al. | ............ 348/208.7 |
| 2006/0132613 A1 | * | 6/2006 | Shin et al. | ................. 348/208.7 |

FOREIGN PATENT DOCUMENTS

JP    2003-111449    4/2003

* cited by examiner

*Primary Examiner*—Melissa J Koval
*Assistant Examiner*—Autumn Parker
(74) *Attorney, Agent, or Firm*—Thomas, Kayden, Horstemeyer & Risley

(57) ABSTRACT

An image sensing module. A movable frame is disposed in and moves with respect to a fixed base. A support base is disposed in the movable frame and moves with respect to the fixed base. An image sensing unit is fixed to the support base. A first guiding mechanism combines the movable frame with the fixed base and moves with respect to the fixed base along a first direction, moving the support base with respect to the fixed base along the first direction. A first coil is disposed on the support base. A first magnet is disposed on the fixed base and opposes the first coil. A first Hall member is disposed on the support base and beside the first coil. When the first coil is energized by a voltage, a magnetic force is generated by the first coil and first magnet, moving the movable frame along the first direction.

7 Claims, 9 Drawing Sheets

IMAGE SENSING MODULE

BACKGROUND OF THE INVENTION

1. Field of the Invention

The invention relates to an image sensing module, and in particular to an image sensing module enabling two-dimensional movement of an image sensing unit therein.

2. Description of the Related Art

U.S. Pat. No. 5,266,988 discloses an image shake suppressing device for a camera, disposed in a lens module thereof. When the camera is in operation, an angular acceleration unit thereof detects angular acceleration produced by vibration of the camera. A circuit analyzes the information of the angular acceleration. A driving member then moves a specific lens of the lens module perpendicular to an optical axis according to the analyzed information of the angular acceleration, correcting or suppressing a vague image caused by vibration of the camera.

Nevertheless, moving the lens perpendicular to the optical axis reduces ambient brightness and MTF value of the lens module, deteriorating optical imaging thereof.

Japan Pat. No. 3551174 discloses a moving mechanism disposed in a lens module of a camera. The moving mechanism employs a piezoelectric member to move an image sensing unit, such as a CCD, perpendicular to an optical axis, correcting or suppressing a vague image caused by vibration of the camera. Moreover, the aforementioned moving mechanism can be applied in any lens module.

Nevertheless, the piezoelectric member requires continuous electric power to properly move the image sensing unit (CCD) and correct the vague image. The CCD, however, is heavier than a single lens. A larger piezoelectric member is thus required to move the CCD. Although the aforementioned moving mechanism does not deteriorate optical imaging of the lens module, the large piezoelectric member increases the volume of the camera.

Hence, there is a need for an enhanced image sensing module correcting or suppressing a vague image caused by vibration of a camera.

BRIEF SUMMARY OF THE INVENTION

A detailed description is given in the following embodiments with reference to the accompanying drawings.

An exemplary embodiment of the invention provides an image sensing module comprising a fixed base, a movable frame, a support base, an image sensing unit, a first guiding mechanism, at least one first coil, at least one first magnet, and a first Hall member. The movable frame is disposed in and moves with respect to the fixed base. The support base is disposed in the movable frame and moves with respect to the fixed base. The image sensing unit is fixed to the support base. The first guiding mechanism combines the movable frame with the fixed base and moves with respect to the fixed base along a first direction, moving the support base disposed in the movable frame with respect to the fixed base along the first direction. The first coil is disposed on the support base. The first magnet is disposed on the fixed base and opposes the first coil. The first Hall member is disposed on the support base and beside the first coil. When the first coil is energized by a voltage, a magnetic force is generated by the first coil and first magnet, moving the movable frame through the first guiding mechanism and along the first direction.

The first guiding mechanism comprises a plurality of first holding portions and a pair of parallel first guide bars. The first holding portions are respectively disposed on the outer side of the movable frame. The first guide bars are fixed to the fixed base. The first holding portions are respectively fit on the first guide bars, combining the movable frame with the fixed base. The movable frame moves along an axial direction of each first guide bar.

The support base comprises a circuit board and a fixing frame connected thereto and surrounding the image sensing unit. The image sensing unit, first coil, and first Hall member are disposed on and electrically connected to the circuit board.

The image sensing module further comprises a second guiding mechanism, at least one second coil, at least one second magnet, and a second Hall member. The second guiding mechanism combines the movable frame with the support base and moves with respect to the movable frame along a second direction. The second coil is disposed on the circuit board. The second magnet is disposed on the fixed base and opposes the second coil. The second Hall member is disposed on the circuit board and beside the second coil. When the second coil is energized by a voltage, a magnetic force is generated by the second coil and second magnet, moving the support base through the second guiding mechanism and along the second direction.

The second guiding mechanism comprises a plurality of second holding portions and a pair of parallel second guide bars. The second holding portions are respectively disposed on the fixing frame of the support base. The second guide bars are fixed to the movable frame. The second holding portions are respectively fit on the second guide bars, combining the movable frame with the support base. The support base moves along an axial direction of each second guide bar.

The axial direction of each second guide bar is perpendicular to that of each first guide bar.

The N and S poles of the first magnet are arranged along the axial direction of each first guide bar.

The N and S poles of the second magnet are arranged along the axial direction of each second guide bar.

When the image sensing module is stationary, two half portions of the first Hall member are respectively above the N and S poles of the first magnet.

When the image sensing module is stationary, two half portions of the second Hall member are respectively above the N and S poles of the second magnet.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the following description and FIGS. 1, 2A-2D, 3, and 4, the first direction X, second direction Y, and third direction Z are perpendicular to each other.

Figure 1:
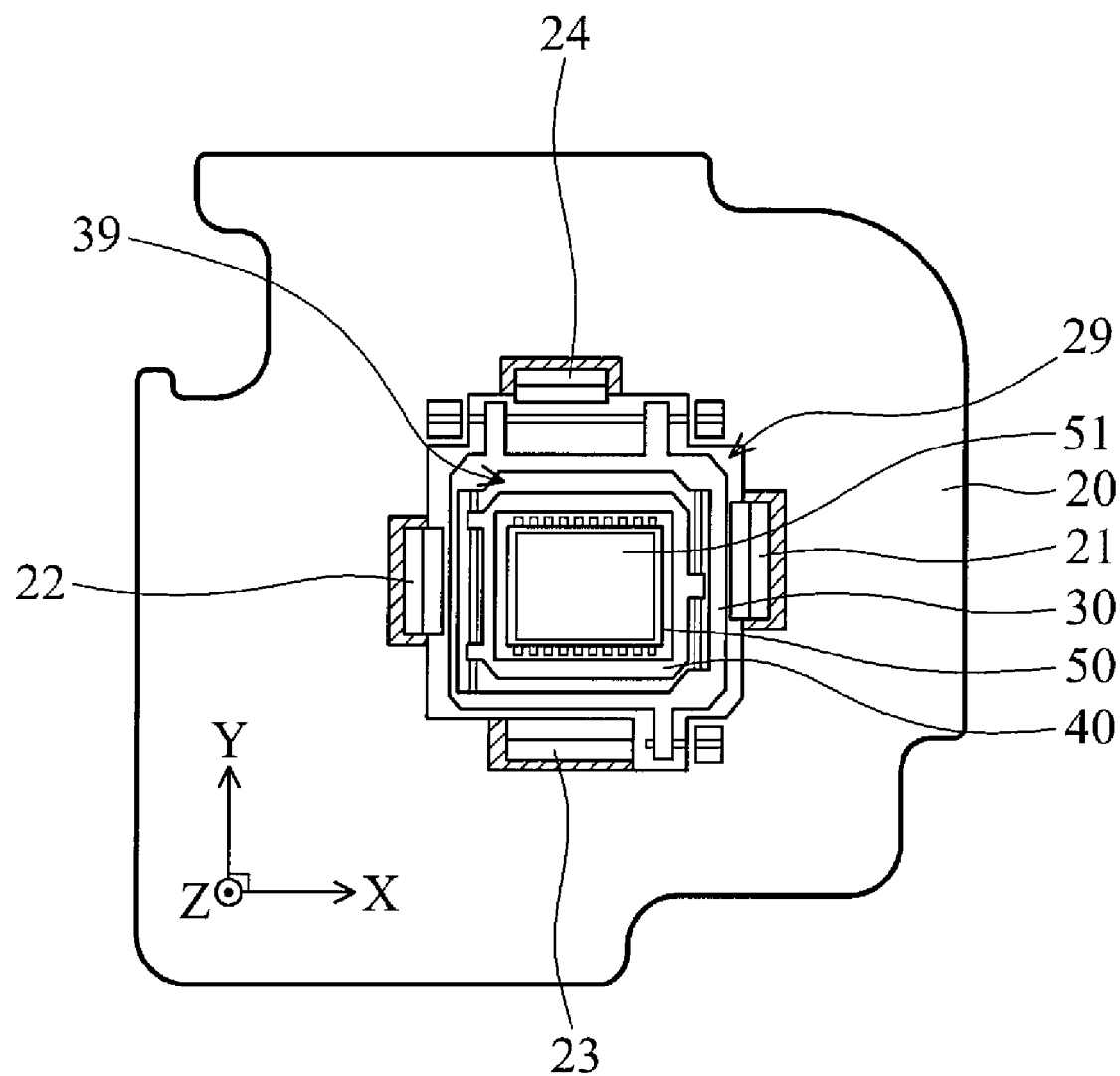
FIG. 1 is a schematic view of an image sensing module of the invention.

Referring to FIG. 1, an image sensing module is applied in a camera to correct or suppress a vague image caused by vibration during operation thereof. The image sensing module comprises a fixed base 20, a movable frame 30, a support base 40, and an image sensing unit 50.

The fixed base 20 comprises a first hollow portion 29 in which the movable frame 30 is disposed. The movable frame 30 comprises a second hollow portion 39 in which the support base 40 is movably disposed. The image sensing unit 50, such as a CCD, is disposed on the support base 40. A sensitization surface 51 of the image sensing unit 50 faces the third direction Z in FIG. 1.

Figure 2A:
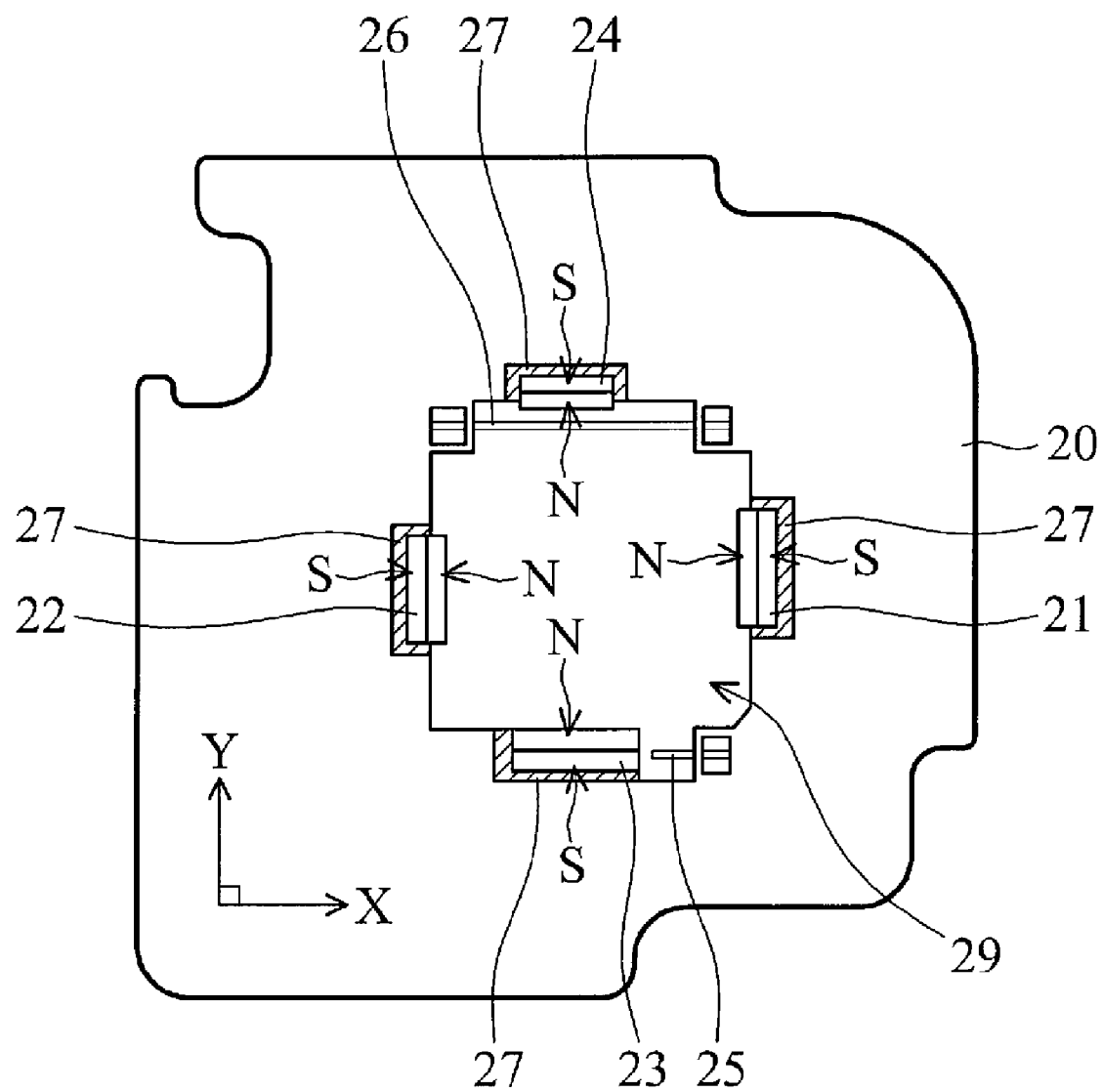
FIGS. 2A to 2D are schematic rear views of a fixed base of the image sensing module of the invention.
Figure 2B:
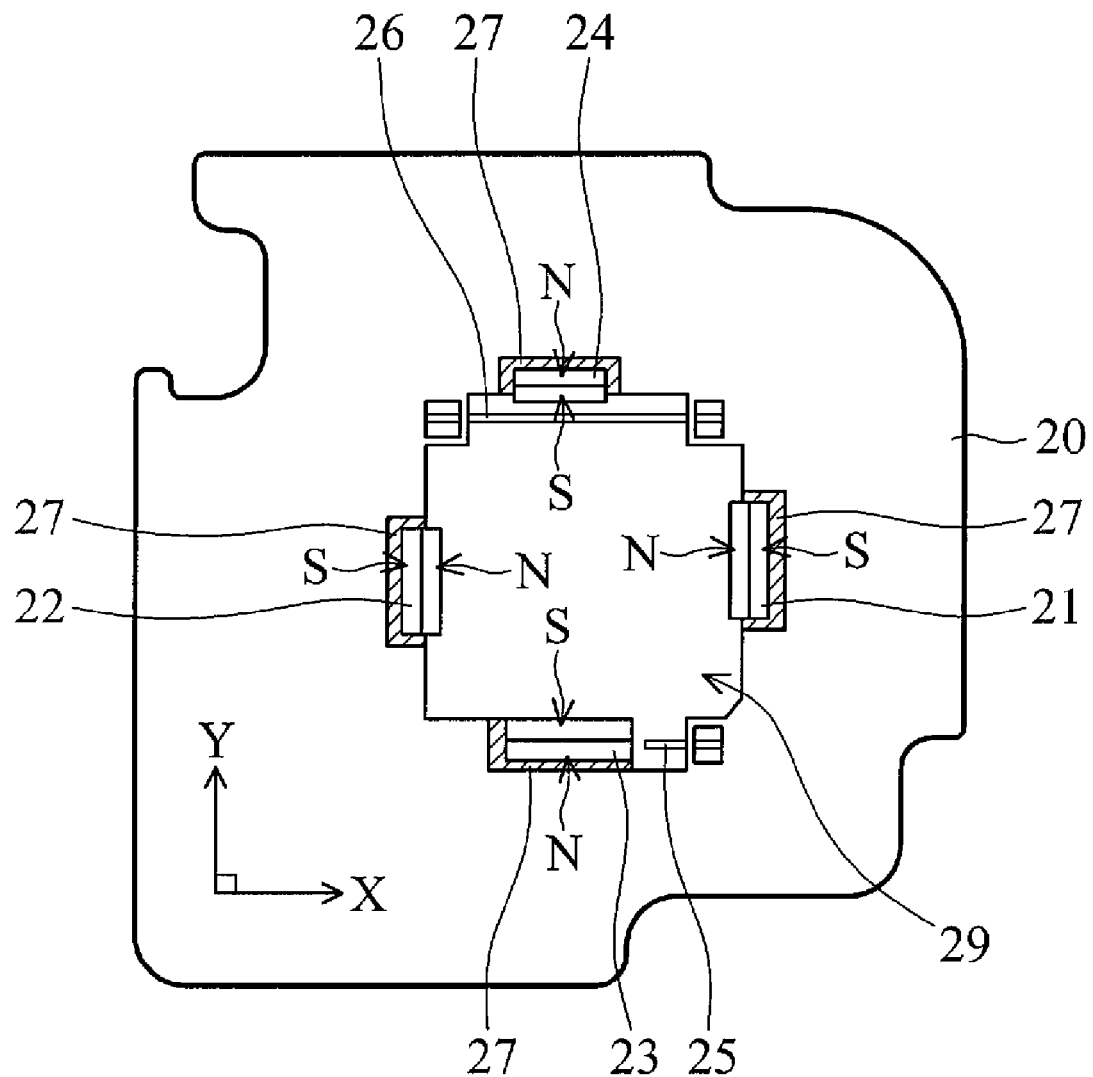
Figure 2C:
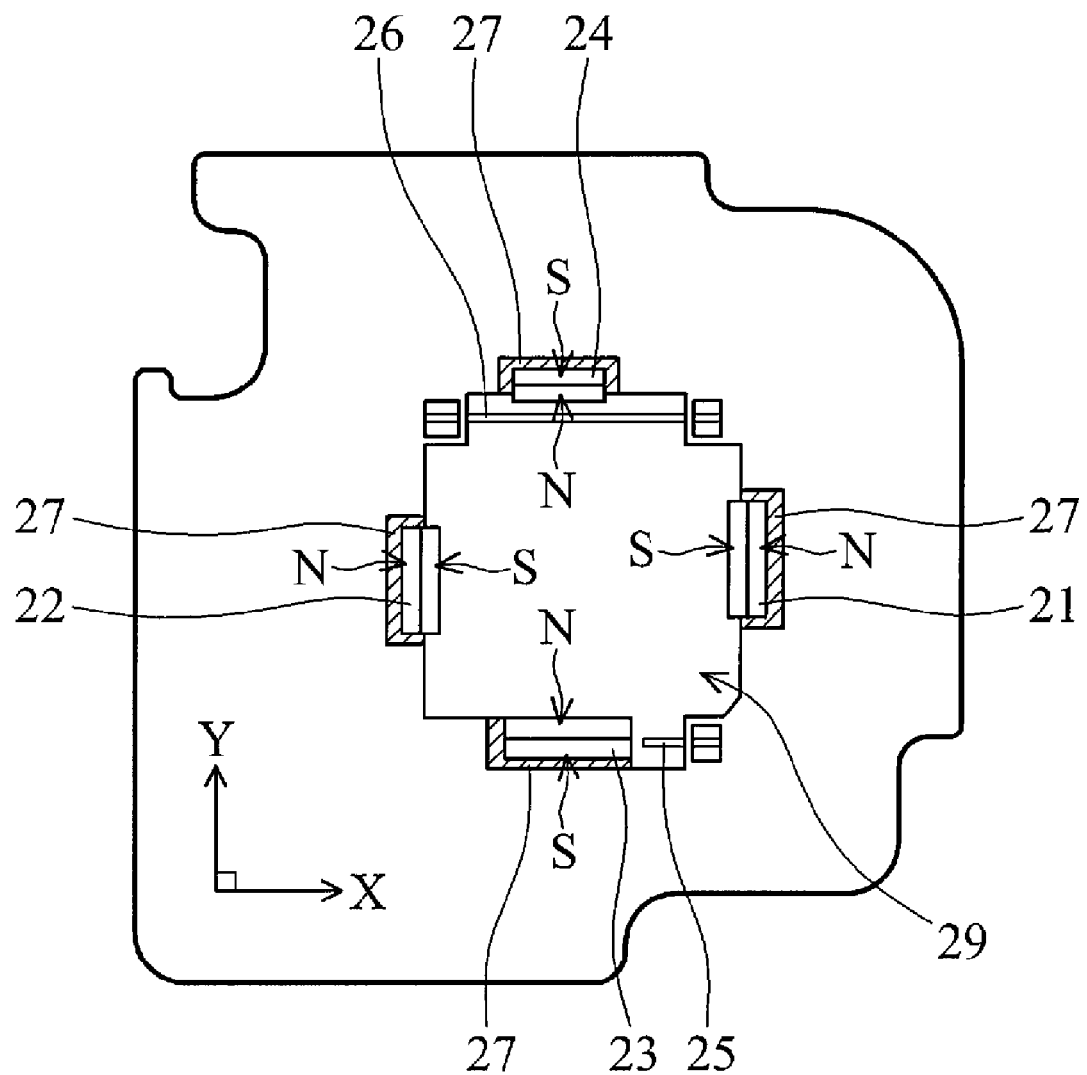
Figure 2D:
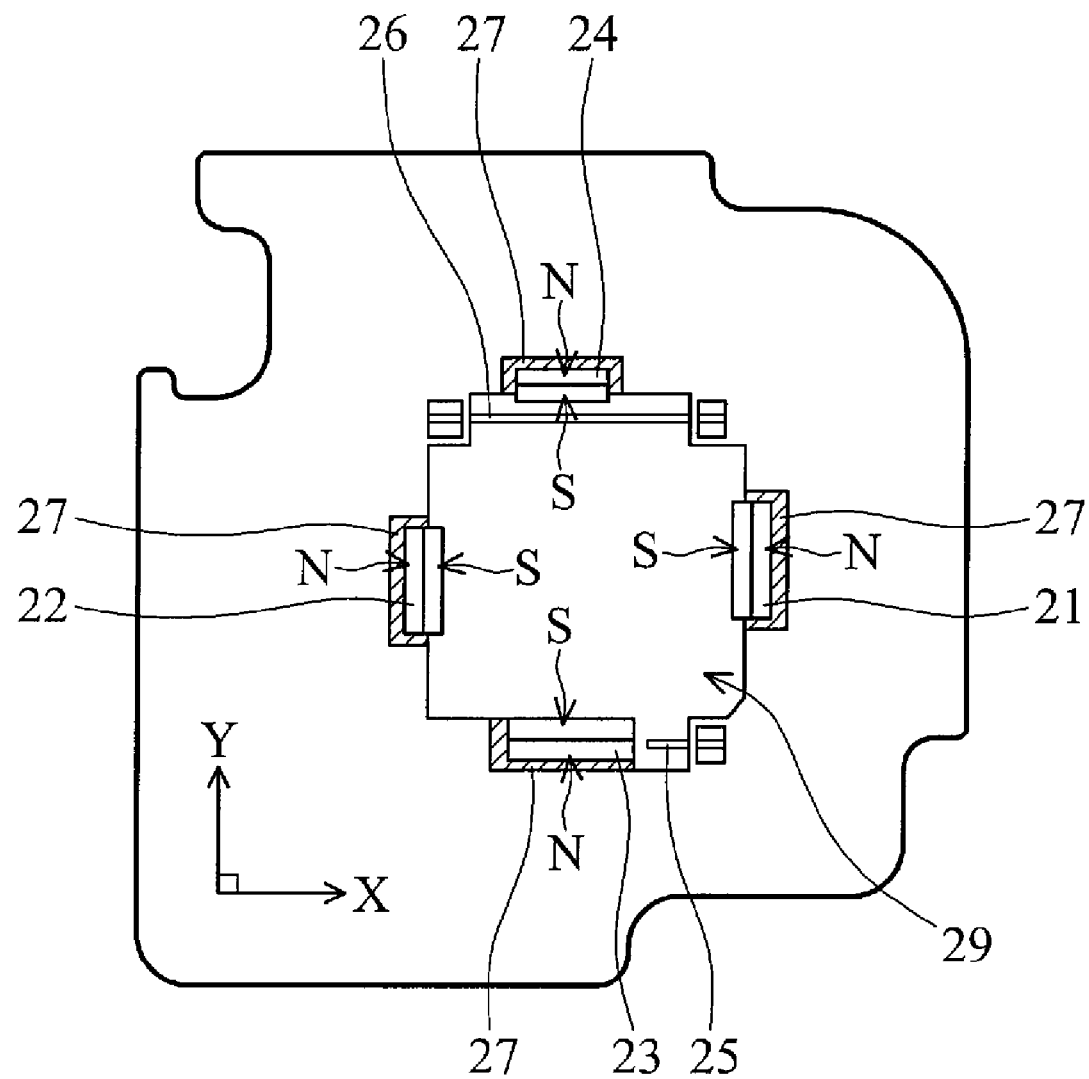

Referring to FIGS. 2A-2D, the fixed base 20 comprises a pair of parallel first magnets 21, 22, a pair of parallel second magnets 23, 24, a first guide bar 25, and a second guide bar 26 parallel to the first guide bar 25. The first magnets 21 and 22 are disposed on two opposite sides of the first hollow portion 29, with N and S poles arranged in the first direction X. The second magnets 23 and 24 are disposed on the other opposite sides of the first hollow portion 29, with N and S poles arranged in the second direction Y. As shown in FIG. 2A, the N poles of the first magnets 21, 22 and second magnets 23, 24 face the interior of the first hollow portion 29. As shown in FIG. 2B, the N poles of the first magnets 21, 22 and S poles of the second magnets 23, 24 face the interior of the first hollow portion 29. As shown in FIG. 2C, the S poles of the first magnets 21, 22 and N poles of the second magnets 23, 24 face the interior of the first hollow portion 29. As shown in FIG. 2D, the S poles of the first magnets 21, 22 and second magnets 23, 24 face the interior of the first hollow portion 29. Specifically, the relative positions and arrangement of magnetic poles of the first magnets 21, 22 and second magnets 23, 24 are not limited to those shown in FIGS. 2A-2D. Moreover, the first magnets 21, 22 and second magnets 23, 24 can be fixed to the fixed base 20 by glue 27, such as UV or thermosetting adhesive. Additionally, the first guide bar 25 and second guide bar 26 are respectively disposed in the first hollow portion 29 in the first direction X and near the second magnets 23 and 24.

Figure 3:
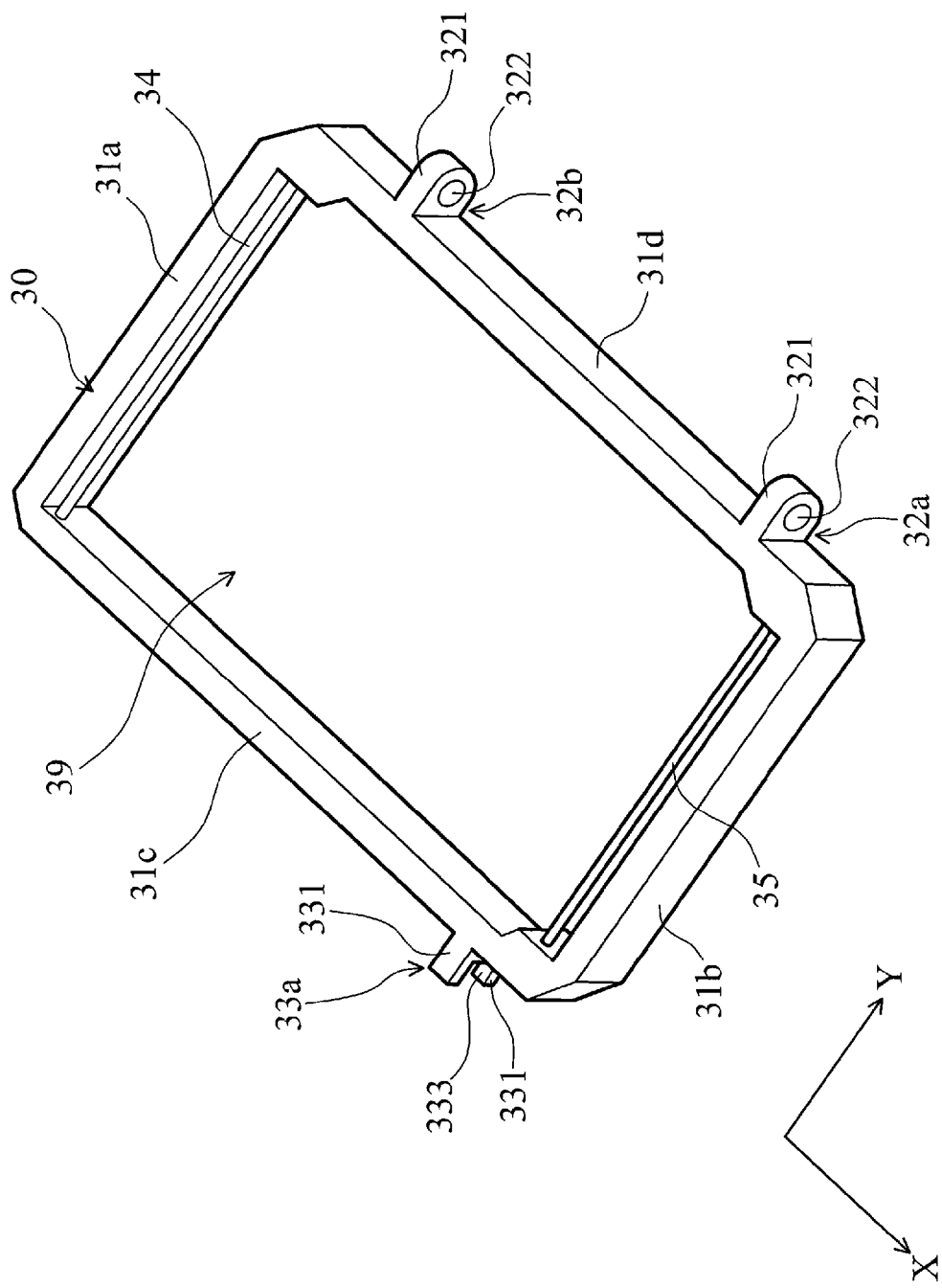
FIG. 3 is a schematic perspective view of a movable frame of the image sensing module of the invention.

Referring to FIG. 3, the movable frame 30 comprises four frame sides 31a, 31b, 31c, and 31d. The frame side 31a is parallel to the frame side 31b and the frame side 31c parallel to the frame side 31d. The frame side 31d comprises two first holding portions 32a and 32b. The frame side 31c comprises a second holding portion 33a. The first holding portions 32a and 32b respectively comprise a protruding arm 321 perpendicular to the outside of the frame side 31d and formed with a through hole 322 in the first direction X. The second holding portion 33a comprises two protruding arms 331 perpendicular to the outside of the frame side 31c. An opening 333 is formed between the protruding arms 331. After fit in the through holes 322 of the first holding portions 32a and 32b, the second guide bar 26 is fixed to the fixed base 20. The first guide bar 25 is fixed to the fixed base 20 and then fit in the opening 333 of the second holding portion 33a. As shown in FIGS. 1, 2A-2D, and 3, the first holding portions 32a and 32b, second holding portion 33a, first guide bar 25, and second guide bar 26 constitute a first guiding mechanism, moving the movable frame 30 with respect to the fixed base 20 in the first direction X.

As shown in FIG. 3, the movable frame 30 comprises a hollow portion 39 formed between the frame sides 31a, 31b, 31c, and 31d. Additionally, the movable frame 30 comprises a third guide bar 34 and a fourth guide bar 35 respectively parallel to the frame side 31a and frame side 31b and in the second direction Y.

Figure 4:
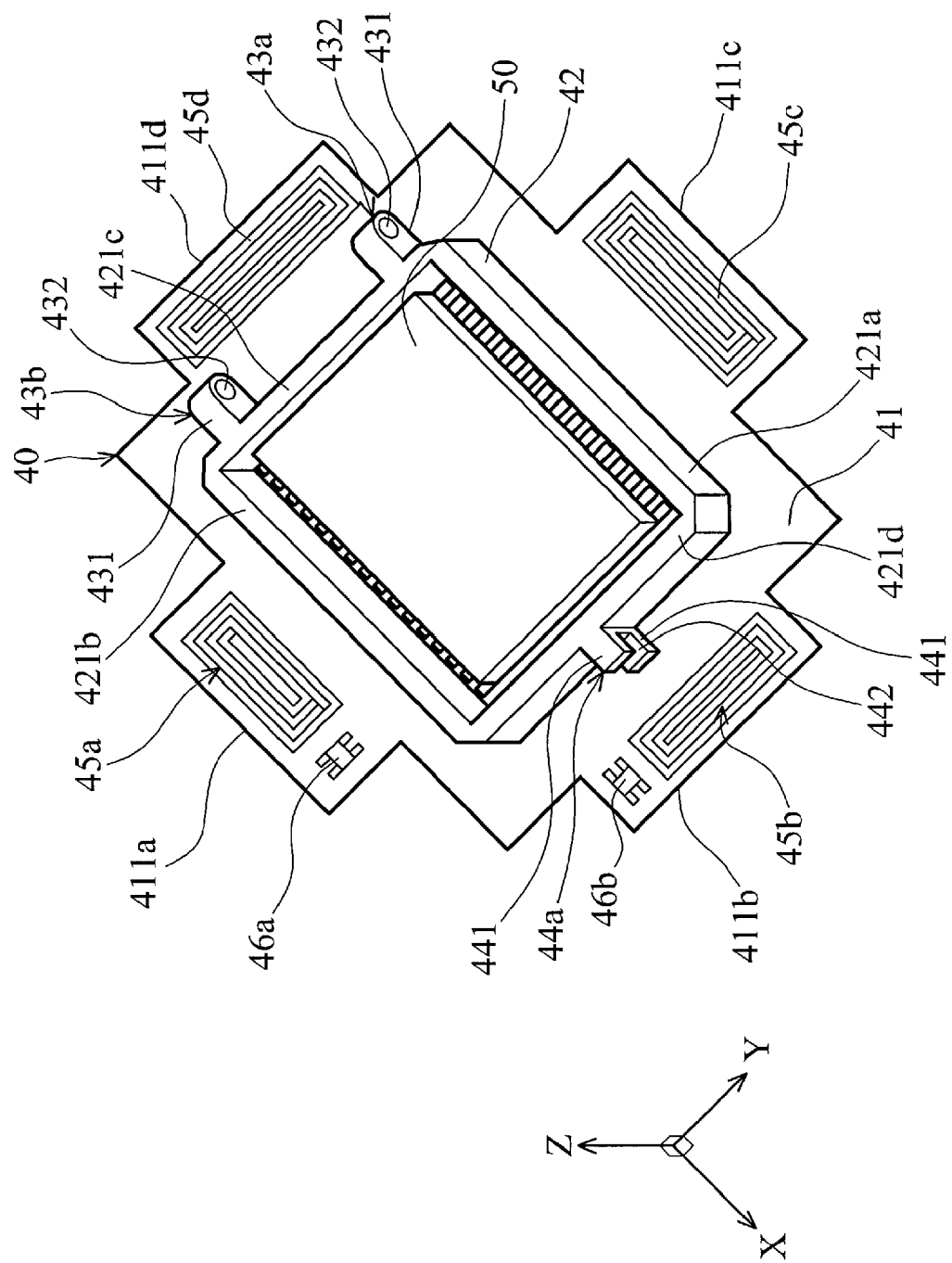
FIG. 4 is a schematic perspective view of a support base and an image sensing unit of the image sensing module of the invention.

Referring to FIG. 4, the support base 40 comprises a circuit board 41, an image sensing unit 50, and a fixing frame 42. The image sensing unit 50 is disposed on the circuit board 41. The fixing frame 42 is disposed on the circuit board 41 and surrounds the image sensing unit 50. Additionally, the fixing frame 42 comprises four frame sides 421a, 421b, 421c, and 421d. The frame side 421c is parallel to the frame side 421d and the frame side 421a parallel to the frame side 421b. The frame side 421c comprises two third holding portions 43a and 43b formed on the outer side thereof. The frame side 421d comprises a fourth holding portion 44a formed on the outer side thereof. The third holding portions 43a and 43b respectively comprise a protruding arm 431 perpendicular to the outer side of the frame side 421c. Each protruding arm 431 is formed with a through hole 432 in the second direction Y. The fourth holding portion 44a comprises two protruding arms 441 perpendicular to the outer side of the frame side 421d. An opening 442 is formed between the protruding arms 441. In this embodiment, after fit in the through holes 432 of the third holding portions 43a and 43b, the third guide bar 34 is fixed to the movable frame 30. The fourth guide bar 35 is fixed to the movable frame 30 and then fit in the opening 442 of the fourth holding portion 44a. As shown in FIGS. 1, 2A-2D, 3, and 4, the third holding portions 43a and 43b, fourth holding portion 44a, third guide bar 34, and fourth guide bar 35 constitute a second guiding mechanism, moving the support base 40 with respect to the fixed base 20 in the second direction Y.

As shown in FIG. 4, the circuit board 41 comprises a first wing 411a, a second wing 411b, a third wing 411c, and a fourth wing 411c. The first wing 411a comprises a first coil 45a and a first Hall member 46a adjacent thereto. The second wing 411b comprises a second coil 45b and a second Hall member 46b adjacent thereto. The third wing 411c and fourth wing 411c respectively comprise a third coil 45c and a fourth coil 45d.

As shown in FIG. 1, after the support base 40 is combined with the movable frame 30 through the second guiding mechanism and combined with the fixed base 20 through the first guiding mechanism, the first coil 45a and third coil 45c are respectively under the second magnets 23 and 24 and the second coil 45b and fourth coil 45d respectively under the first magnets 21 and 22. Electronic signals are transmitted between the circuit board 41, image sensing unit 50, first coil 45a, second coil 45b, third coil 45c, fourth coil 45d, first Hall member 46a, second Hall member 46b, and other electronic members (not shown).

Specifically, magnetic force is generated between the first coil 45a and the second magnet 23 and between the third coil 45c and the second magnet 24, moving the support base 40 with respect to the fixed base 20 in the second direction Y. In another aspect, magnetic force is generated between the second coil 45b and the first magnet 21 and between the fourth coil 45d and the first magnet 22, moving the movable frame 30 (support base 40) with respect to the fixed base 20 in the first direction X.

Figure 5:
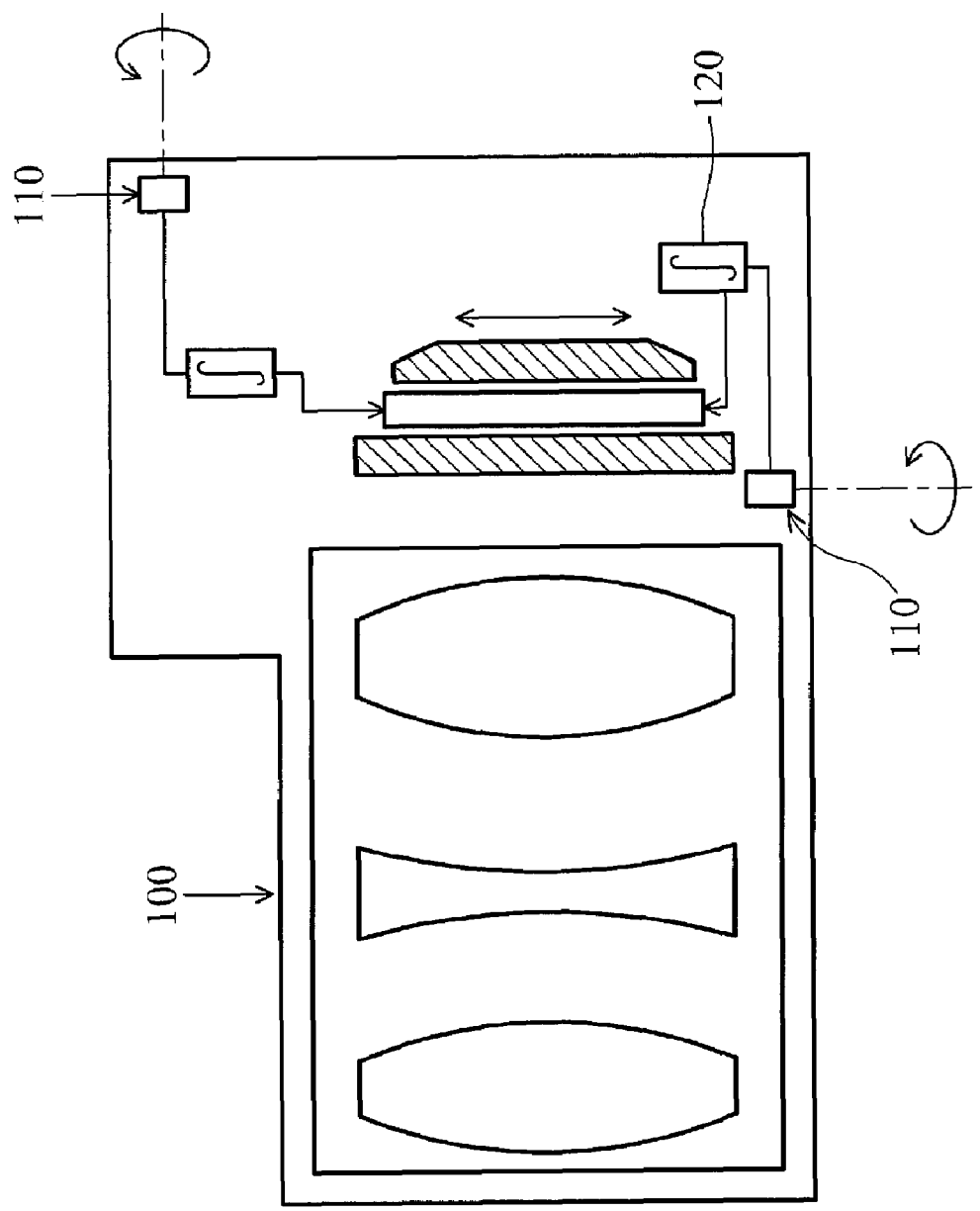
FIG. 5 is a schematic view of a camera containing the image sensing module of the invention.

FIG. 5 is a schematic view of a camera 100 containing the image sensing module of the invention. As shown in FIG. 1 and FIG. 5, the camera 100 comprises two vibration sensing members 110, such as angular acceleration members or acceleration members. When the vibration sensing members 110 detect a vibration value of the camera 100, a pulse width modulation (PWM) circuit 120 or digital circuit outputs a voltage signal to the first coil 45a, second coil 45b, third coil 45c, and fourth coil 45d. The first coil 45a, second coil 45b, third coil 45c, and fourth coil 45d respectively generate variable magnetic fields and react with the first magnets 21 and 22 and second magnets 23 and 24, moving the support base 40 with respect to the fixed base 20 in the first direction X and second direction Y. Accordingly, the image sensing unit 50 moves with respect to the fixed base 20 in the first direction X and second direction Y, correcting or suppressing a vague image caused by vibration of the camera 100.

Figure 6:
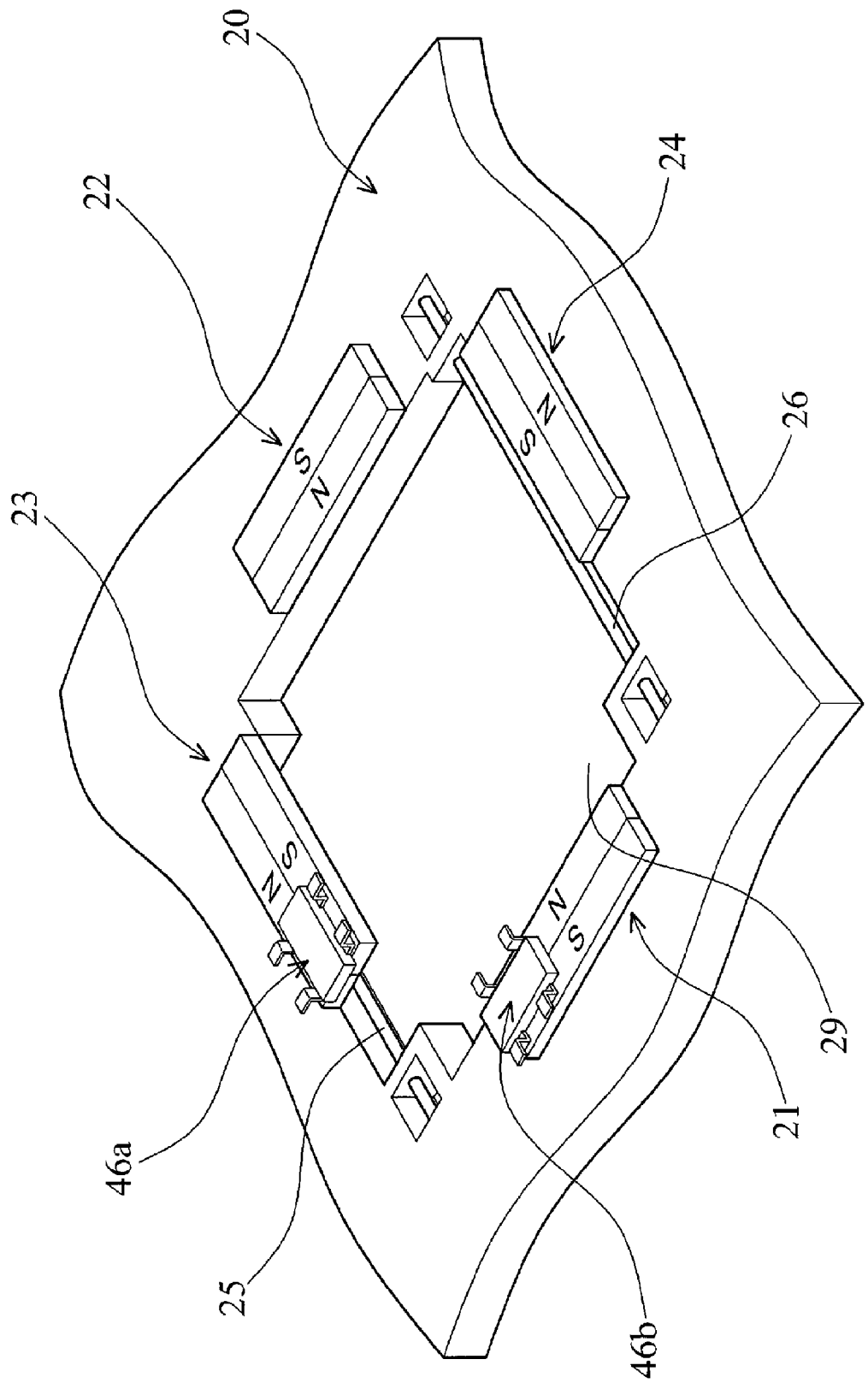
FIG. 6 is a schematic perspective view of the fixed base, containing two first magnets, two second magnets, a first Hall member, and a second Hall member, of the image sensing module of the invention.

Referring to FIG. 6, when the camera 100 is stationary, the image sensing module is stationary as well. At this point, two half portions of the first Hall member 46a are respectively above the N and S poles of the second magnet 23 and two half portions of the second Hall member 46b respectively above the N and S poles of the first magnet 21. At this point, no change of magnetic field is detected by the first Hall member 46a and second Hall member 46b. When the camera 100 vibrates, the first coil 45a, second coil 45b, third coil 45c, and fourth coil 45d respectively react with the first magnets 21 and 22 and second magnets 23 and 24, moving the support base 40 in the first direction X and second direction Y. The first Hall member 46a and second Hall member 46b detect change of magnetic fields provided by the second magnet 23 and first magnet 21. Accordingly, moving distance and frequency required by the support base 40 can be determined and the voltage signal output by the pulse width modulation (PWM) circuit 120 or digital circuit can be adjusted by analyzing the change of magnetic fields detected by the first Hall member 46a and second Hall member 46b.

In conclusion, as the disclosed image sensing module adjusts the position of the image sensing unit with respect to an optical axis of the camera without changing the position of lenses in a lens module, ambient brightness and imaging quality of the lens module are not reduced. Moreover, as the disclosed image sensing module employs a pair of coils and magnets to move the image sensing unit in a direction perpendicular to the optical axis, the sizes of all members therein are reduced, reducing the size of the camera.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image sensing module, comprising:
a fixed base;
a movable frame disposed in and moving with respect to the fixed base;
a support base disposed in the movable frame and moving with respect to the fixed base and movable frame, wherein the support base comprises a circuit board and a fixing frame;
an image sensing unit fixed to the support base, wherein the fixing frame is connected to the circuit board and surrounds the image sensing unit;
a first guiding mechanism combining the movable frame with the fixed base and moving with respect to the fixed base along a first direction, moving the support base disposed in the movable frame with respect to the fixed base along the first direction;
a second guiding mechanism combining the movable frame with the support base and moving with respect to the movable frame along a second direction, wherein the second guiding mechanism comprises a plurality of second holding portions and a pair of parallel second guide bars, the second holding portions are respectively disposed on the fixing frame of the support base, the parallel second guide bars are fixed to the movable frame, the second holding portions are respectively fit on the second guide bars, combining the movable frame with the support base, and the support base moves along an axial direction of each second guide bar;
at least one first coil disposed on the support base;
at least one second coil disposed on the circuit board;
at least one first magnet disposed on the fixed base and opposing the first coil;
at least one second magnet disposed on fixed base and opposing the second coil;
a first Hall member disposed on the circuit board and beside the first coil, wherein the image sensing unit, first coil, and first Hall member are disposed on and electrically connected to the circuit board, when the first coil is energized by a voltage, a magnetic force is generated by the first coil and first magnet, moving the movable frame through the first guiding mechanism and along the first direction; and
a second Hall member disposed on the circuit board and beside the second coil, wherein, when the second coil is energized by a voltage, a magnetic force is generated by the second coil and second magnet, moving the support base through the second guiding mechanism and along the second direction.

2. The image sensing module as claimed in claim 1, wherein the first guiding mechanism comprises:
a plurality of first holding portions respectively disposed on the outer side of the movable frame; and
a pair of parallel first guide bars fixed to the fixed base, wherein the first holding portions are respectively fit on the first guide bars, combining the movable frame with the fixed base, and the movable frame moves along an axial direction of each first guide bar.

3. The image sensing module as claimed in claim 1, wherein the axial direction of each second guide bar is perpendicular to that of each first guide bar.

4. The image sensing module as claimed in claim 1, wherein the N and S poles of the first magnet are arranged along the axial direction of each first guide bar.

5. The image sensing module as claimed in claim 4, wherein, when the image sensing module is stationary, two half portions of the first Hall member are respectively above the N and S poles of the first magnet.

6. The image sensing module as claimed in claim 1, wherein the N and S poles of the second magnet are arranged along the axial direction of each second guide bar.

7. The image sensing module as claimed in claim 6, wherein, when the image sensing module is stationary, two half portions of the second Hall member are respectively above the N and S poles of the second magnet.

* * * * *